United States Patent
Shirakawa et al.

(10) Patent No.: US 9,712,372 B2
(45) Date of Patent: Jul. 18, 2017

(54) CABLE SIGNAL DETECTOR

(71) Applicant: Hitachi Metals, Ltd., Tokyo (JP)

(72) Inventors: Yohei Shirakawa, Hitachi (JP); Koki Hirano, Hitachinaka (JP); Yoshitake Ageishi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/929,294

(22) Filed: Oct. 31, 2015

(65) Prior Publication Data

US 2016/0133111 A1 May 12, 2016

(30) Foreign Application Priority Data

Nov. 11, 2014 (JP) ................................. 2014-228958

(51) Int. Cl.
| | |
|---|---|
| *G08B 21/00* | (2006.01) |
| *H04L 29/06* | (2006.01) |
| *H04L 12/413* | (2006.01) |
| *H04B 10/07* | (2013.01) |
| *G01R 19/145* | (2006.01) |

(52) U.S. Cl.
CPC ............. *H04L 29/06* (2013.01); *H04B 10/07* (2013.01); *H04L 12/413* (2013.01); *G01R 19/145* (2013.01)

(58) Field of Classification Search
CPC .. G01R 19/2513; G01R 31/02; G01R 31/026; G01R 31/041; G01R 31/086; G01R 19/145; G01R 31/04; H01R 13/6691; H01R 24/64; H01R 13/66; H01R 13/665; H01R 31/005; G08B 21/18; G08B 21/182; H04L 12/00; H04L 29/06; H04L 12/413; H04B 10/07
USPC ................. 340/660, 635, 653, 645, 657, 651
See application file for complete search history.

(56) References Cited

U.S. PATENT DOCUMENTS

| | | | | |
|---|---|---|---|---|
| 5,298,888 | A * | 3/1994 | McEachern | ........... G01R 23/165 324/107 |
| 7,603,570 | B2 * | 10/2009 | Schindler | .............. G06F 1/3203 713/300 |

(Continued)

FOREIGN PATENT DOCUMENTS

JP 5274671 B2 8/2013

*Primary Examiner* — Anh V La
(74) *Attorney, Agent, or Firm* — McGinn IP Law Group, PLLC.

(57) ABSTRACT

A cable signal detector is configured to detect the presence or absence of information communication in a communication cable including a plurality of signal line pairs for differential signaling. The cable signal detector includes a plurality of detecting portions each of which is configured to partially branch and draw a transmission signal from a different signal line pair, rectify the branched and drawn signal into a direct current, and output that direct current, and a displaying portion configured to display the presence or absence of information communication, based on outputs of the plurality of detecting portions. The outputs of the plurality of detecting portions are connected in series, and the displaying portion is configured to display the presence or absence of information communication, based on an overall output voltage of the plurality of detecting portions connected in series.

19 Claims, 1 Drawing Sheet

(56) References Cited

U.S. PATENT DOCUMENTS

| | | | |
|---|---|---|---|
| 7,705,741 B2 * | 4/2010 | Picard | G01R 31/021 340/652 |
| 8,415,955 B2 * | 4/2013 | Devine | G01R 19/145 324/500 |
| 8,935,543 B2 * | 1/2015 | Hunter, Jr. | H04L 12/10 307/18 |
| 2013/0217249 A1 | 8/2013 | Patel et al. | |

* cited by examiner

7 MATCHING CIRCUIT
8 RECTIFYING CIRCUIT

CABLE SIGNAL DETECTOR

The present application is based on Japanese patent application No. 2014-228958 filed on Nov. 11, 2014, the entire contents of which are incorporated herein by reference.

BACKGROUND OF THE INVENTION

1. Field of the Invention

This invention relates to a cable signal detector.

2. Description of the Related Art

In data centers and the like, a layout change, movement, or addition of information communication equipment such as servers, hubs, etc. requires a change of connections of communication cables, such as LAN (Local Area Network) cables, etc.

To determine the presence or absence of connections of the communication cables, some information communication equipment has a lamp for identifying connections of the communication cables.

Also, an information communication equipment has also been proposed that detects connector insertion or removal for the communication cables, to monitor connections of the communication cables (See e.g. Japanese Patent No. 5,274,671).

SUMMARY OF THE INVENTION

However, the conventional art as described above has the problem that it is only able to identify whether or not the communication cables are being physically connected, but unable to identify whether or not communication is actually performed using the communication cables, in other words, unable to identify the presence or absence of information communication.

For this reason, with the presence of communication being unidentified, the communication cables are likely to be erroneously unplugged, and it is also conceivable that a failure such as an information communication equipment service outage, transfer data corruption, or the like occurs.

Moreover, there is also the problem that when the connections of the communication cables are monitored as in Japanese Patent No. 5,274,671, because the communication cables are required to be equipped with a built-in monitoring signal line, no general-purpose communication cable can be used, and cost becomes high.

Moreover, displaying the presence or absence of information communication also requires suppression of degradation of a signal to be transmitted through the communication cables.

Accordingly, it is an object of the present invention to provide a cable signal detector, which solves the above problems, and which is capable of displaying the presence or absence of information communication, thereby being able to suppress erroneous unplugging of a communication cable, use a general-purpose communication cable, and suppress degradation of a signal to be transmitted through the communication cable.

(1) According to an embodiment of the invention, a cable signal detector, which is configured to detect the presence or absence of information communication in a communication cable including a plurality of signal line pairs for differential signaling, comprises:

a plurality of detecting portions each of which is configured to partially branch and draw a transmission signal from a different signal line pair, rectify the branched and drawn signal into a direct current, and output that direct current; and a displaying portion configured to display the presence or absence of information communication, based on outputs of the plurality of detecting portions, wherein the outputs of the plurality of detecting portions are connected in series, and the displaying portion is configured to display the presence or absence of information communication, based on an overall output voltage of the plurality of detecting portions connected in series.

In the embodiment, the following modifications and changes may be made.

(i) The plurality of detecting portions are connected in series with an inductive element therebetween for alternating current interruption.

(ii) The communication cable includes four of the signal line pairs, and four of the detecting portions are provided in correspondence with the four signal line pairs.

(iii) The detecting portions each of which includes:

a matching circuit to adjust a level of the signals drawn from the signal line pairs; and a rectifying circuit to rectify an output from the respective matching circuit into a direct current, and output that direct current.

(iv) The detecting portions each of which further comprises an amplifying circuit to amplify the signal output from the respective matching circuit and output the amplified signal to the respective rectifying circuit.

(v) The plurality of detecting portions and the display portion are provided for a connector, which is provided at an end of the communication cable, or a relay connector, to which is connected that connector.

POINTS OF THE INVENTION

The present invention allows for providing the cable signal detector, which is capable of displaying the presence or absence of information communication, thereby being able to suppress erroneous unplugging of the communication cable, use a general-purpose communication cable, and suppress degradation of the signal to be transmitted through the communication cable.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Below is described an embodiment according to the invention, in conjunction with the accompanying drawings.

Figure 1A:
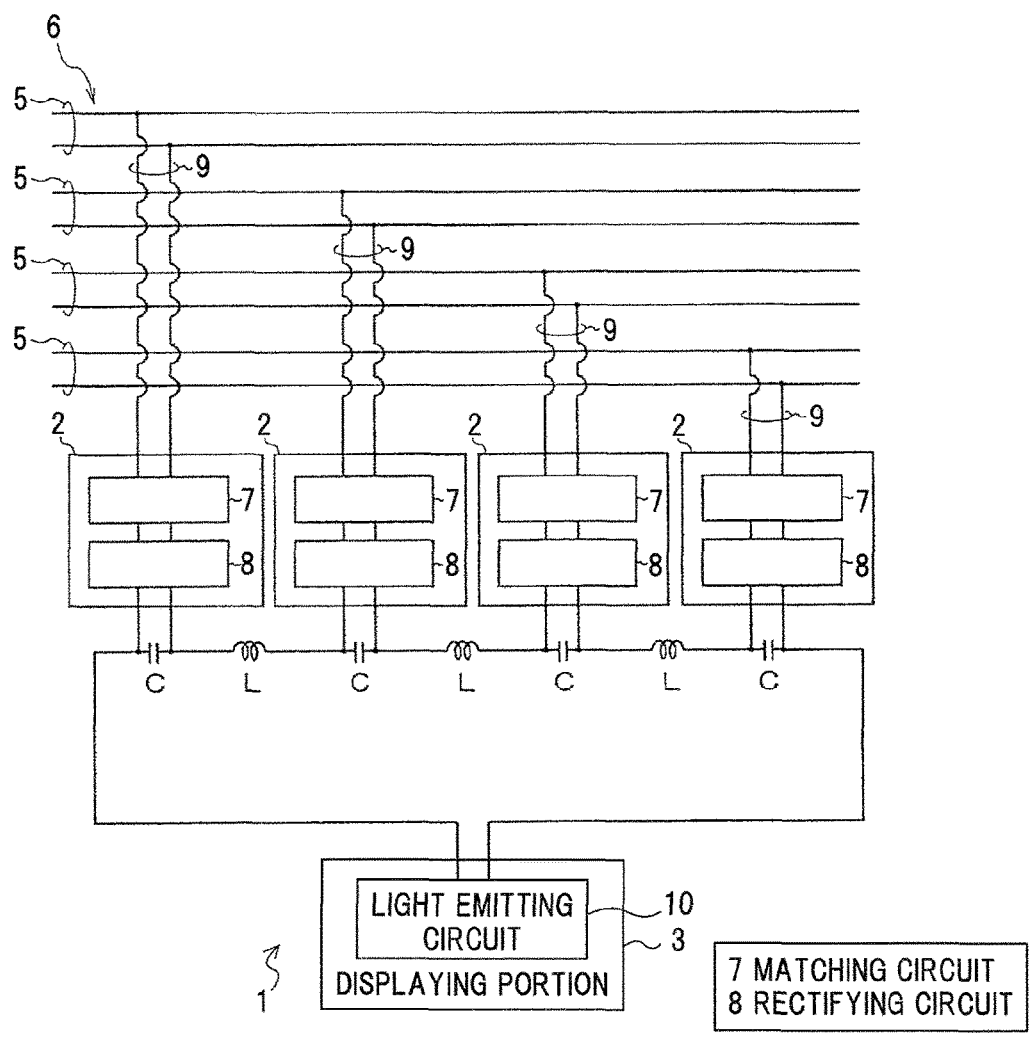
FIG. 1A is a schematic configuration diagram showing a cable signal detector in one embodiment of the present invention.
Figure 1B:
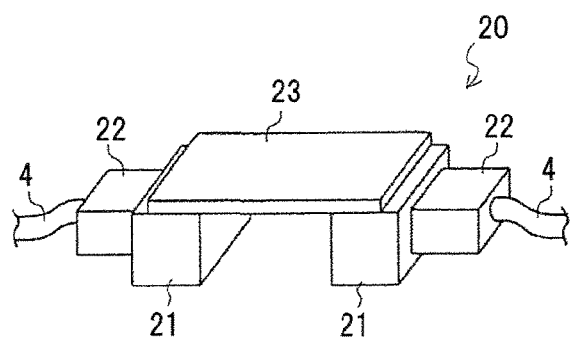
FIG. 1B is a perspective view showing a relay connector for the cable signal detector to be mounted thereon.

FIG. 1A is a schematic configuration diagram showing a cable signal detector 1 in the present embodiment, and FIG. 1B is a perspective view showing a relay connector for the cable signal detector 1 to be mounted thereon.

As shown in FIGS. 1A and 1B, the cable signal detector 1 is configured to detect the presence or absence of information communication in a communication cable 4 including a plurality of signal line pairs (not shown) for differential signaling, and is equipped with a plurality of detecting portions 2 and a displaying portion 3.

As the communication cable 4, it is possible to use a general-purpose LAN (Local Area Network) cable. This embodiment uses the communication cable 4 including four signal line pairs (eight signal lines in total) for differential signaling.

The plurality of detecting portions 2 and the display portion 3 are provided for a connector 22, which is provided at an end of the communication cable 4, or a relay connector 20, to which is connected that connector 22. This embodiment describes a case where the cable signal detector 1 is provided for the relay connector 20.

The relay connector 20 includes two connectors 21, and is configured to connect together the communication cables 4 connected to both the connectors 21, respectively. The connectors 21 are, e.g., a jack connector that complies with a standard called RJ45, and are configured in such a manner that it is possible to connect thereto the connectors 22 (e.g. plug connectors that comply with the RJ45 standard) provided at the ends of the communication cables 4 respectively.

Both the connectors 21 are mounted on a circuit board 23. This circuit board 23 is mounted with the plurality of detecting portions 2 and the displaying portion 3 thereon.

In this embodiment, because of the use of the communication cables 4 including their respective four pairs of signal lines for differential signaling, a signal transmission portion 6 including four transmission line pairs 5 in correspondence with the four signal transmission pairs is formed between both the connectors 21. The signal transmission portion 6 is mounted on the circuit board 23.

Each of the detecting portions 2 is configured to partially branch and draw a transmission signal from the signal line pairs of the communication cable 4, rectify the branched and drawn signal into a direct current, and output that direct current. In this embodiment, each of the detecting portions 2 is configured to partially branch and draw the transmission signal from the transmission line pairs 5 of the signal transmission portion 6.

The cable signal detector 1 is configured to include the four detecting portions 2 in correspondence with the four signal line pairs (transmission line pairs 5). Each of the detecting portions 2 is configured to partially branch and draw the transmission signal from the different signal line pair (transmission line pair 5), rectify the branched and drawn signal into a direct current, and output that direct current.

Each of the detecting portions 2 is composed of a matching circuit 7 and a rectifying circuit 8 sequentially connected therein.

The respective matching circuit 7 is designed for impedance matching in a predetermined frequency band. In the present embodiment, since the transmission signal is partially branched and drawn from the signal line pairs of the communication cables 4 (the transmission line pairs 5 of the signal transmission portion 6), the respective matching circuit 7 also serves to adjust a level of the signals drawn from the signal line pairs.

In this embodiment, the signals transmitted through branched transmission lines 9, which are branched from the transmission line pair 5 respectively, are input to the respective matching circuit 7. The respective matching circuit 7 is configured to appropriately include, for example, a resistive circuit, an LC filter and the like.

The respective rectifying circuit 8 is configured to rectify an alternating current signal output from the respective matching circuit 7 into a direct current, and output that direct current. As the rectifying circuits 8, it is possible to use a known full-wave rectifying circuit or a known half-wave rectifying circuit.

Although not shown, an amplifying circuit to amplify the signal output from the respective matching circuit 7 and output the amplified signal to the respective rectifying circuit 8 may further be provided between the respective matching circuit 7 and the respective rectifying circuit 8. In this case, it should be noted, however, that a battery, etc. for supplying power to those amplifying circuits is needed. In the present embodiment, since no amplifier is used, no battery, etc. is needed, and therefore size reduction and weight reduction are possible, and it is also possible to suppress signal quality degradation resulting from passing output signals of the amplifying circuits into the communication cable 4.

The displaying portion 3 is configured to display the presence or absence of information communication based on outputs from the plurality (herein, four) of detecting portions 2. In the present embodiment, the outputs of the plurality of detecting portions 2 are connected in series, and the displaying portion 3 is configured to display the presence or absence of information communication, based on an overall output voltage of the plurality of detecting portions 2 connected in series.

In this embodiment, the displaying portion 3 includes a light emitting circuit 10 to display the presence or absence of information communication by light emission. The light emitting circuit 10 includes a light emitting element such as a light emitting diode or the like, and is configured to emit light from that light emitting element, based on the overall output voltage of the plurality of detecting portions 2.

Further, in the present embodiment, the plurality of detecting portions 2 are connected in series with an inductive element L therebetween for alternating current interruption. This allows for suppressing the occurrence of crosstalk resulting from inputting of an alternating current signal leaked from the detecting portions 2 into the other detecting portions 2. Herein, furthermore, each of the detecting portions 2 is configured to be shorted with a capacitive element C between its outputs, and thereby further suppress the occurrence of crosstalk.

Incidentally, although in the present embodiment, the four detecting portions 2 are provided in correspondence with the four signal line pairs, the number of detecting portions 2 is not limited thereto, but may also be two or three.

Functions of this embodiment will be described.

The cable signal detector 1 in this embodiment includes the plurality of detecting portions 2 configured to partially branch and draw the transmission signals from the different signal line pairs, rectify the branched and drawn signals into direct currents, and output those direct currents, and the displaying portion 3 configured to display the presence or absence of information communication, based on the outputs of the plurality of detecting portions 2, and the outputs of the plurality of detecting portions 2 are connected in series, and the displaying portion 3 is configured to display the presence or absence of information communication, based on an overall output voltage of the plurality of detecting portions 2 connected in series.

This configuration allows for displaying the presence or absence of information communication of the communication cables 4, and thereby suppressing erroneous unplugging of the communication cables 4.

Further, in the present embodiment, since it is not necessary to provide a monitoring signal line and the like for the communication cables 4 as in the conventional art, it is possible to use a general-purpose communication as the communication cables 4, and cost is low.

Furthermore, in the present embodiment, since the displaying portion 3 is configured to display the presence or absence of information communication, based on the overall output voltage of the plurality of detecting portions 2 connected in series, it is possible to stably detect the presence or absence of information communication even when lowering the level of the signal drawn by each of the detecting portions 2, and it is possible to suppress reflection loss and insertion loss, and thereby suppress signal quality degradation of the signal transmitted through the communication cable 4.

Moreover, since the signals are drawn from the plurality of signal line pairs, there is little effect of temporal variation in signal strength, and it is therefore possible to stably detect the presence or absence of the information communication.

Furthermore, even when each of the detecting portions 2 is provided with an amplifying circuit, it is possible to reduce the output power of their respective amplifying circuits, suppress power consumption, and suppress signal quality degradation resulting from passing the output signals of the amplifying circuits into the communication cable 4.

The invention is not limited to the above embodiment, but various alterations may naturally be made without departing from the spirit and scope of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A cable signal detector, configured to detect a presence or an absence of information communication in a communication cable including a plurality of signal line pairs for differential signaling, the cable signal detector comprising:
   a plurality of detecting portions each of which is configured to partially branch and draw a transmission signal from a different signal line pair, rectify the branched and drawn signal into a direct current, and output the direct current; and
   a displaying portion configured to display the presence or the absence of information communication, based on outputs of the plurality of detecting portions,
   wherein the outputs of the plurality of detecting portions are connected in series, and the displaying portion is configured to display the presence or the absence of information communication, based on an overall output voltage of the plurality of detecting portions connected in series,
   wherein the displaying portion is connected in series with a plurality of inductive elements for alternating current interruption and a plurality of capacitive elements, thereby providing a series circuit, and
   wherein the plurality of detecting portions are connected with the series circuit.

2. The cable signal detector according to claim 1, wherein the communication cable includes four of the signal line pairs, and
   four of the detecting portions are provided in correspondence with the four signal line pairs.

3. The cable signal detector according to claim 1, wherein said each of the detecting portions includes:
   a matching circuit to adjust a level of the signals drawn from the signal line pairs; and
   a rectifying circuit to rectify an output from a respective matching circuit into the direct current, and to output the direct current.

4. The cable signal detector according to claim 3, wherein said each of the detecting portions further comprises an amplifying circuit to amplify the signal output from the respective matching circuit and to output the amplified signal to the respective rectifying circuit.

5. The cable signal detector according to claim 1, wherein the plurality of detecting portions and the displaying portion are provided for a connector, which is provided at an end of the communication cable, or a relay connector, to which is connected that connector.

6. The cable signal detector according to claim 1, wherein said each of the plurality of detecting portions is connected with the series circuit via a pair of transmission lines, and
   wherein each of the plurality of capacitive elements is provided between connecting portions between the pair of transmission lines and the series circuit.

7. The cable signal detector according to claim 1, wherein said each of the plurality of detecting portions is connected with the series circuit via a pair of transmission lines connected to a respective one of the plurality of capacitive elements.

8. The cable signal detector according to claim 1, wherein, in the series circuit, each of the plurality of inductive elements is provided between adjacent capacitive elements of the plurality of capacitive elements.

9. The cable signal detector according to claim 1, wherein each of the plurality of inductive elements is provided between adjacent capacitive elements of the plurality of capacitive elements.

10. The cable signal detector according to claim 1, wherein, in the series circuit, one of the plurality of inductive elements is provided between adjacent capacitive elements of the plurality of capacitive elements.

11. The cable signal detector according to claim 1, wherein, in the series circuit, each of the plurality of inductive elements is connected in series with adjacent capacitive elements of the plurality of capacitive elements.

12. The cable signal detector according to claim 1, wherein, in the series circuit, one of the plurality of inductive elements is connected in series with adjacent capacitive elements of the plurality of capacitive elements.

13. The cable signal detector according to claim 1, wherein each of the plurality of inductive elements in connected in series with adjacent capacitive elements of the plurality of capacitive elements.

14. The cable signal detector according to claim 1, wherein said each of the detecting portions includes:
   a matching circuit to adjust a level of the transmission signal drawn from the signal line pairs, and
   wherein the transmission signal, which is transmitted through branched transmission lines branched from the different signal line pair, is inputted into the matching circuit.

15. The cable signal detector according to claim 14, wherein said each of the detecting portions further includes:
   a rectifying circuit to rectify an output from a respective matching circuit into the direct current, and to output the direct current to the series circuit.

16. The cable signal detector according to claim 15, wherein the respective matching circuit is connected with the series circuit via a pair of transmission lines.

17. The cable signal detector according to claim 16, wherein one of the plurality of capacitive elements is provided between connecting portions between the pair of transmission lines and the series circuit.

18. The cable signal detector according to claim 16, wherein one of the pair of transmission lines is coupled to one of the plurality of capacitive elements.

19. The cable signal detector according to claim 16, wherein said one of the pair of transmission lines is further coupled to one of the plurality of inductive elements.

\* \* \* \* \*